United States Patent [19]

Moriya

[11] Patent Number: 5,208,760
[45] Date of Patent: May 4, 1993

[54] METHOD AND DEVICE FOR RECOGNIZING CROSS SECTIONAL EXTERNAL FORM AND DIMENSIONS OF A WORKPIECE IN A BANDSAW MACHINE

[75] Inventor: Kikuo Moriya, Machida, Japan
[73] Assignee: Amada Company, Limited, Japan
[21] Appl. No.: 649,042
[22] Filed: Feb. 1, 1991

Related U.S. Application Data

[63] Continuation-in-part of Ser. No. 352,889, May 17, 1989, abandoned.

[30] Foreign Application Priority Data

May 17, 1988 [JP] Japan .................. 63-120052
Jun. 2, 1988 [JP] Japan .................. 63-134470

[51] Int. Cl.⁵ ........................... G06F 15/46
[52] U.S. Cl. .................. 364/474.37; 364/474.09; 364/474.34; 83/820
[58] Field of Search ............ 364/474.37, 474.09, 364/474.13, 562, 563, 564, 474.34; 83/820

[56] References Cited

U.S. PATENT DOCUMENTS 2,346,031  4/1944  Jones et al. .
3,852,579 12/1974  Sohn et al. .
3,967,242  6/1976  Isoo et al. .
4,073,247  2/1978  Cunningham et al. .
4,363,254 12/1982  Aizawa et al. .
4,371,941  2/1983  Gordiski et al. .
4,432,260  2/1984  Sarurai et al. .
4,451,892  5/1984  McMurtry .
4,644,832  2/1987  Smith .
4,708,180 11/1987  Browning, Jr. et al. .
4,748,570  5/1988  Shochi et al. .
4,805,500  2/1989  Saito et al. .

FOREIGN PATENT DOCUMENTS 2084923  4/1982  United Kingdom .
2162461  2/1986  United Kingdom .

*Primary Examiner*—Jerry Smith
*Assistant Examiner*—Patrick D. Muir
*Attorney, Agent, or Firm*—Wigman & Cohen

[57] ABSTRACT

A method and device for measuring the shape and dimensions of a workpiece which is to be cut by a sawing machine. The method includes detecting the width of the workpiece, detecting the contact angle or contact position when the saw blade contacts the workpiece, detecting the presence or absence of a workpiece vertical side surface, judging whether the cross-sectional shape of the workpiece is round or square from data including the width of the workpiece, the contact angle or contact position, and the presence or absence of a workpiece vertical side, and displaying and calculating the dimensions of the workpiece. The device includes a width detector for the detecting the width of the workpiece, a contact angle detector for detecting the contact angle or contact position when the saw blade contacts the workpiece, and a vertical surface detector for detecting the presence or absence of a workpiece vertical side surface. Also included is calculation apparatus for judging whether the cross sectional shape of a workpiece is round or square from the data including the width of the workpiece, the contact angle or contact position, and the presence or absence of a vertical side surface, as well as apparatus for displaying the shape and dimensions of a workpiece.

6 Claims, 7 Drawing Sheets

FIG.4

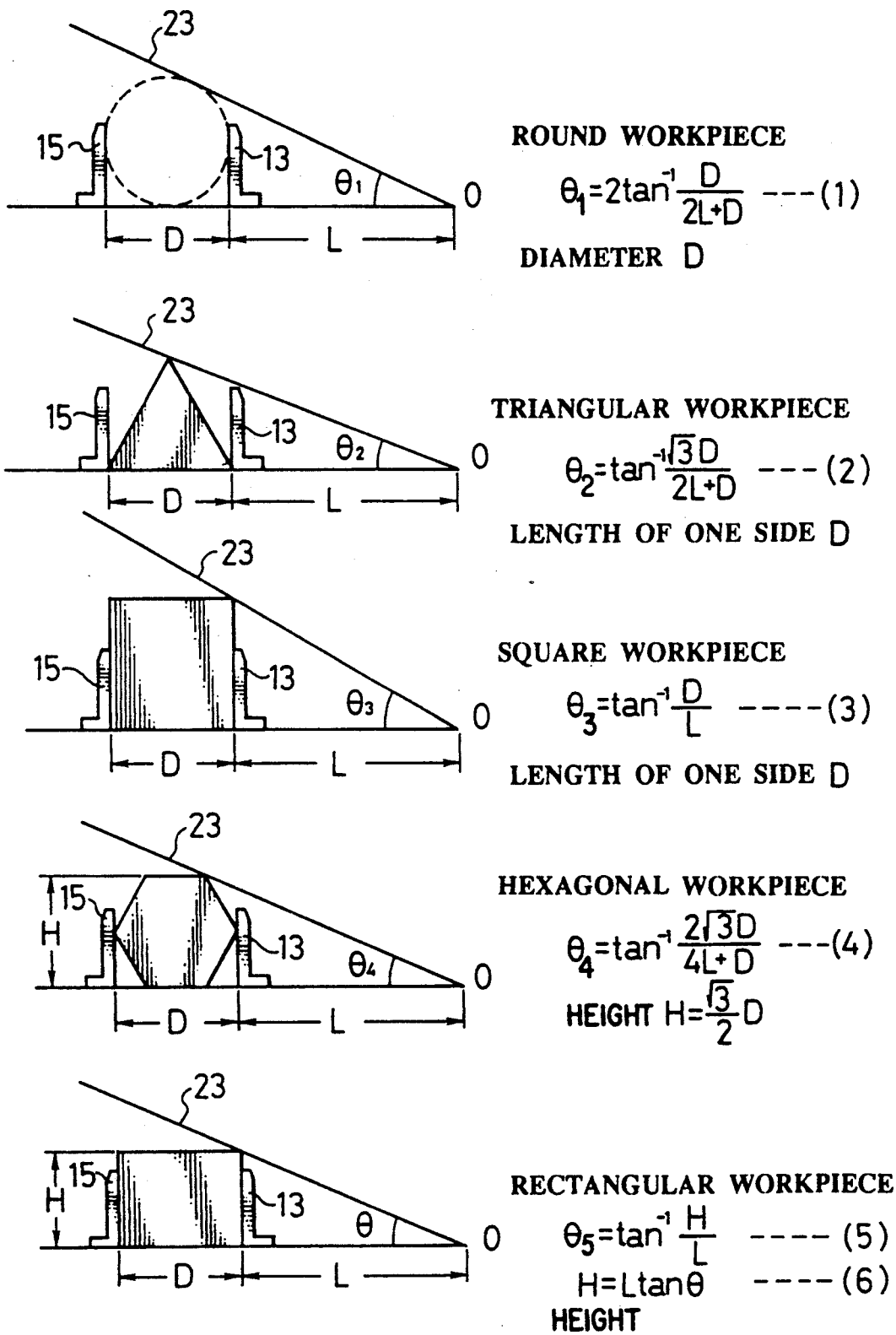

ROUND WORKPIECE $$\theta_1 = 2\tan^{-1}\frac{D}{2L+D} \quad ---(1)$$

DIAMETER D

TRIANGULAR WORKPIECE $$\theta_2 = \tan^{-1}\frac{\sqrt{3}D}{2L+D} \quad ---(2)$$

LENGTH OF ONE SIDE D

SQUARE WORKPIECE $$\theta_3 = \tan^{-1}\frac{D}{L} \quad ----(3)$$

LENGTH OF ONE SIDE D

HEXAGONAL WORKPIECE $$\theta_4 = \tan^{-1}\frac{2\sqrt{3}D}{4L+D} \quad ---(4)$$

HEIGHT $H = \frac{\sqrt{3}}{2}D$

RECTANGULAR WORKPIECE $$\theta_5 = \tan^{-1}\frac{H}{L} \quad ----(5)$$

$$H = L\tan\theta \quad ----(6)$$

HEIGHT

METHOD AND DEVICE FOR RECOGNIZING CROSS SECTIONAL EXTERNAL FORM AND DIMENSIONS OF A WORKPIECE IN A BANDSAW MACHINE

RELATED APPLICATIONS

This application is a continuation-in-part application of U.S. patent application Ser. No. 07/352,889, filed May 17, 1989 now abandoned.

BACKGROUND OF THE INVENTION

1. Field of the Invention

The present invention relates to a bandsaw machine provided with an endless bandsaw blade, and, in particular, to a method and device for measuring the cross sectional external form and dimensions of a workpiece being cut in the bandsaw machine and a device for automatically adjusting the position of a blade guide to conform to the external form of the workpiece.

2. Description of the Prior Art

When a workpiece is cut by a bandsaw blade, it is advantageous to know in advance the cross sectional external form and dimensions of the workpiece in order to avoid an erroneous cutting due to misjudgment in the workpiece supply and also in order to adjust the position of a saw blade guide to conform the external form of the workpiece.

Conventionally, the operator generally uses a scale to measure the shape and dimensions of the workpiece. Devices have been proposed to make such measurements automatically, such as the device with the configuration outlined in U.S. Pat. No. 4,432,260. In the above-mentioned prior art, when the workpiece is measured using a scale means connected to the vise device, and the height of the workpieces is measured using a scale means in the vertical direction. Accordingly, it is possible to measure the width and the height of the workpiece automatically. However, there is no facility for judging if the shape is square or circular, and therefore the judgment of the shape of the workpiece is dependent on the observations of the operator.

In recent years, the need has arisen for a device to automatically convey a workpiece into the sawing machine to allow the cutting of many different types of workpieces automatically. This requires automatic measurement of the shape and dimensions of the workpiece in the sawing machine.

In addition, it is desirable to be able to reduce the distortion and the vibration of the bandsaw blade of a bandsaw machine when cutting into the workpiece.

Regardless of the type—horizontal or vertical—for a bandsaw machine it is normal to provide a saw blade guide for guiding the saw blade on each side of the workpiece. Conventionally, one of these saw blade guides is set in a fixed position while the other is usually adjusted beforehand to a position conforming to the maximum width of cut in the workpiece. Accordingly, when, for example, the workpiece is a round rod, the spacing of the saw blade guide is set large enough to conform to the diameter of the round rod. For this reason, when the saw blade first contacts and begins to cut into the round with respect to the dimensions of the spacing of the blade can be produced.

Specifically, in a conventional bandsaw machine the adjustment of the position of the saw blade guides must be performed manually. The problem therefore arises that, not only the adjustment of the blade guide position requires a great deal of trouble, but also bending of the saw blade readily occurs at the first cut.

In consideration of the problems associated with such conventional devices, technology has been developed to automatically adjust the spacing of the saw blade guides to conform to changes in the length of the cut in the workpiece. Specifically, such technology is disclosed, for example, in U.S. Pat. No. 4,363,254. This prior art incorporates a configuration in which one of the saw blade guides is moved by means of a hydraulic cylinder which is controlled by a changeover valve, and the changeover valve is controlled by means of a profiling contact member which is moved by the workpiece. Accordingly, in this prior art, as the saw blade advances to cut into the workpiece, the configuration limits the form of the workpiece. Specifically, when cutting a workpiece with a complicated form, for example, joist or I beam, the contact member may lose the shape of the workpiece to trace or cause a defective conflict between the blade guide and the workpiece.

SUMMARY OF THE INVENTION

First object of the present invention is to provide, with due consideration to the drawbacks of such conventional device, a method to recognize an external cross sectional form and dimensions of the workpiece to be cut by the bandsaw machine so that an erroneous cutting due to misplacement of material is prevented.

Second object of the present invention is to provide a bandsaw machine wherein the bandsaw blade is guided by, at least, one blade guide movable in response to the external cross sectional form and dimensions of the workpiece and the progress of the cutting work so that the bandsaw blade is well guided by the blade guide at a point close by the workpiece.

The first object is achieved in the present invention by a method to presume the external cross section form of the workpiece and to measure its dimensions.

The method comprises steps of measuring the width of the workpiece, detecting the position of the bandsaw blade when the bandsaw blade contacts the workpiece, and sensing the presence of absence of the workpiece vertical side surface. In addition, the second object is achieved by detections of the positional relationship between the bandsaw blade and the workpiece, based on the already known workpiece form and measuring each position of the bandsaw blade in fixed time intervals so as to movably keep the bandsaw blade successively in the position near the workpiece.

BRIEF DESCRIPTION OF THE DRAWINGS

These and other objects, features, and advantages of the present invention will become more apparent from the following description of the preferred embodiments taken in conjunction with the accompanying drawings, in which:

FIG. 4 is an explanatory drawing which shows the relationship between the width D and the contact angle $\theta n$ for round, triangular, square, hexagonal, and rectangular workpieces.

DETAILED DESCRIPTION OF THE PREFERRED EMBODIMENTS

Now referring to FIG. 1 and FIG. 2, the complete configuration of a bandsaw machine including the device of the present invention will be explained.

Figure 1:
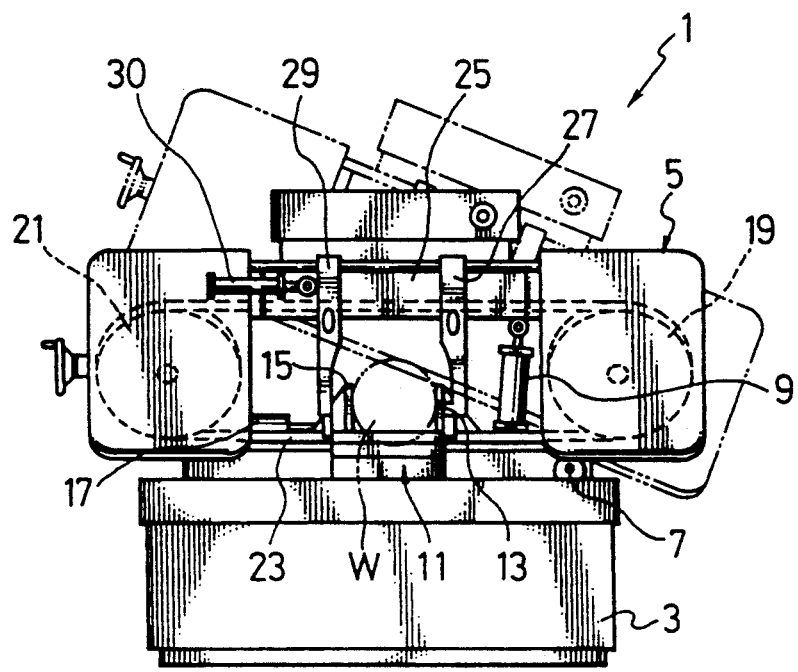
FIG. 1 is an elevation drawing showing the complete confirguration of a band saw machine.
Figure 2:
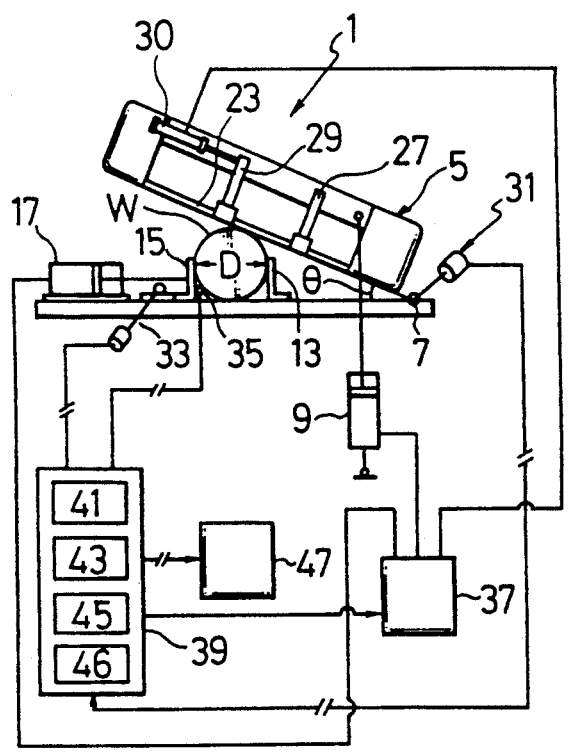
FIG. 2 is a block diagram of an embodiment of the device of the present invention.

As shown in FIG. 1, on a machine stand 3 of a bandsaw machine 1, as is generally known, a saw blade housing 5 rotates around a shaft 7, and is installed in a freely rotatable manner in the vertical direction by means of an elevating cylinder 9. In addition, a vise device 11 is provided on the machine stand 3 and a workpiece W is interposedly secured between a fixed vise jaw 13 and a movable vise jaw 15. The movable vise jaw 15 can be freely moved in the lateral direction by a transfer cylinder 17.

As is generally known, a driving wheel 19 and a follower wheel 21 are bearingly supported in a freely rotatable manner in the saw blade housing 5 and an endless loop-shaped saw blade 23 runs on the wheels 19, 21. In the center section of the saw blade housing, a guide member 25 is provided, extending laterally. A pair of guide brackets (saw blade guides) 27, 29 are provided in a freely positional adjustable manner to guide the saw blade 23 parallel to the guide member 25, and a saw blade guide transfer cylinder 30 is provided which moves and positions the movable guide bracket 29 corresponding to the shape and dimensions of the workpiece W.

Next, a specific structure for measuring the shape and dimensions of the workpiece W in a sawing machine with a configuration of the type outlined above will be explained. As shown in FIG. 2, a contact angle detector 31 is provided on the rotating shaft 7 of the saw blade housing 5 to measure the angle of rotation $\theta$ or the position of the saw blade 23. The contact angle detector 31 can be, for example, a rotary encoder or the like which is linked to the rotation of the saw blade housing 5 and detects the angle of rotation $\theta$ or the position of the saw blade 23. Further, the detection of whether or not the saw blade 23 has contacted the workpiece W can be accomplished by a device which detects the passage of electricity between the saw blade we and the workpiece W, or by a device which detects the load on the drive motor of the saw blade 23.

In addition, a width detector 33 and a vertical surface detector 35 are provided on the movable vise jaw 15 for detecting the width of the workpiece W and for detecting the existence of a vertical surface on the cross sectional corner section of the workpiece W respectively. The width detector 33 comprises a rack which moves together with the movable vise jaw 15 and a rotary encoder fitted with a pinion which engages the rack, or the like.

Figure 3:
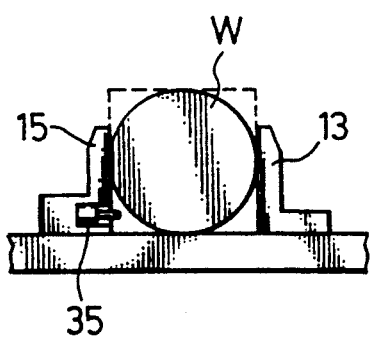
FIG. 3 is an explanatory drawing of an example of a vertical surface detector.

The vertical surface detector 35, as shown in FIG. 3, comprises a microswitch provided at the lower part of the movable vise jaw 15. The actuator of the microswitch normally projects slightly from the inner clamping surface, and when a square bar or other straight sided material is fed into the vise device 11, the actuator retreats and outputs a signal showing that a right angled section is present on the workpiece.

A hydraulic pressure control device 37 is connected to a hydraulic pump (omitted from the drawings) and a variety of changeover valves (omitted from the drawings) for feeding and discharging hydraulic fluid to the elevating cylinder 9 for the housing 5, the transfer cylinder 17 for the movable vise jaw 15, and the saw blade guide transfer cylinder 30.

A calculation device 39 which calculates the dimensions and estimates the shape of the workpiece W is provided with a control section 46 for controlling a memory section 41, a calculation section 43, a judgment section 45, and the hydraulic pressure control device 37. The memory section 41 stores the contact angle $\theta n$ (where n=1, 2, 3, 4) as a mathematical function of the D, as shown in the equations (1) to (4), $\theta n$ (n=1, 2, 3, 4) being for round, triangular, square, hexagonal, and rectangular workpieces, as shown in FIG. 4. As seen in FIG. 4, for a round workpiece, $\theta_1 = 2 \tan^{-1} \frac{D}{2L + D}$ ;

for a triangular workpiece, $\theta_2 = \tan^{-1} \frac{\sqrt{3}\, D}{2L + D}$ ;

for a square workpiece, $\theta_3 = \tan^{-1} \frac{D}{L}$ ;

for a hexagonal workpiece, $\theta_4 = \tan^{-1} \frac{2\sqrt{3}\, D}{4L + D}$ ; and for a rectangular workpiece, $\theta_5 = \tan^{-1} \frac{H}{L}$ , where H=L tan $\theta$. Here, D is the width of the workpiece, L is the distance between the inner clamping surface of the fixed vise jaw 13 and the center of rotation O of the saw blade. The calculation section 43 performs the required calculations based on the signals from the various detectors. The judgment section 45 compares the calculated value with the detected value and estimates the shape of the workpiece. The control section 46 controls the position of the saw blade guide from the estimation of the shape and dimensions of the workpiece W and controls the hydraulic pressure control device 37. A display section 47 displays the shape and dimensions of the workpiece W based on the signal from the calculation device 39.

Figure 5:
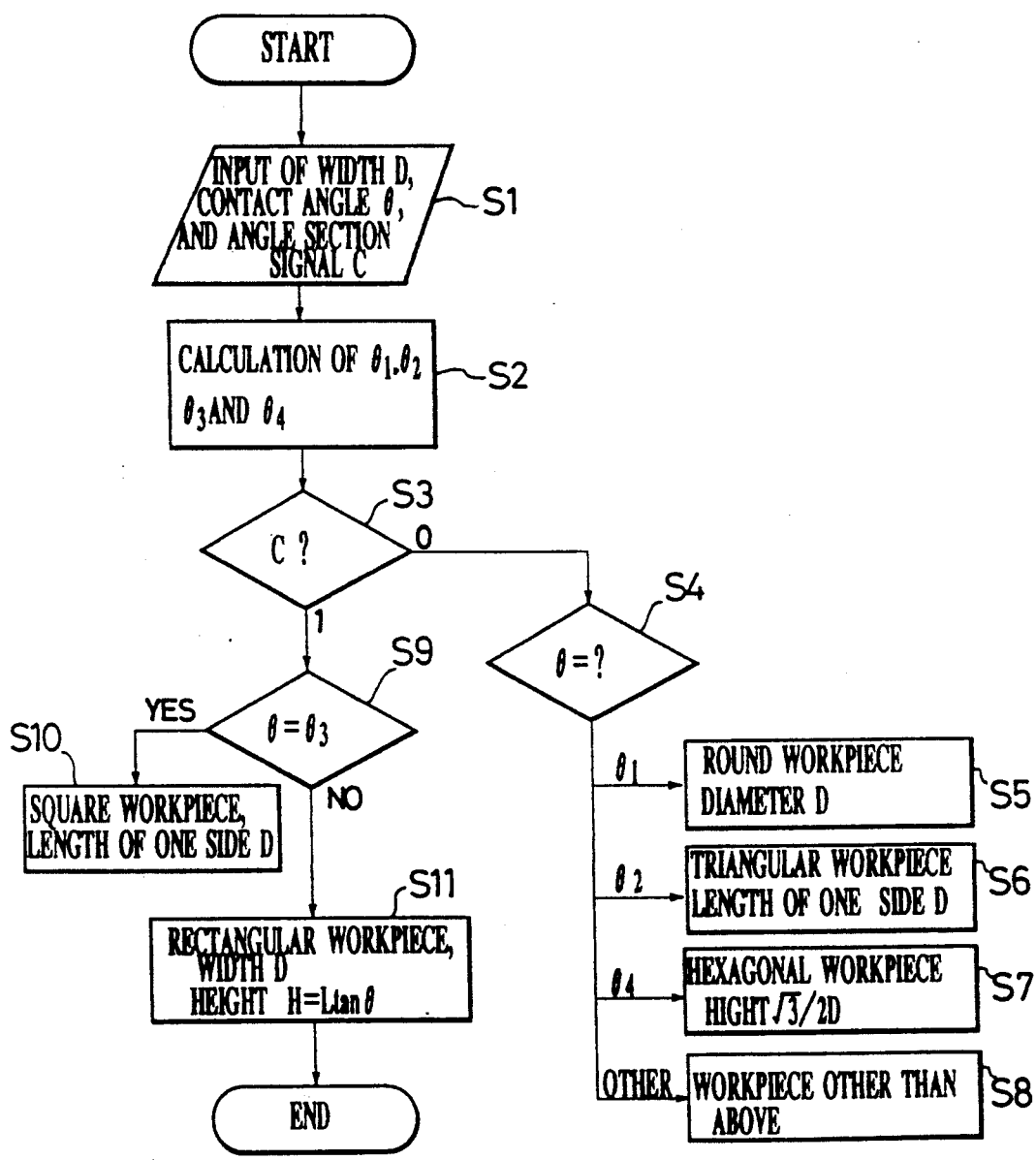
FIG. 5 is a flow chart showing the measurement method using the device of the present invention.

Next, the method of measuring the shape and dimensions of the workpiece W using the device of the present invention will be explained with reference to the flow chart of FIG. 5. First, in Step $S_1$ the width D of the workpiece W from the width detector 33, the contact angle $\theta$ from the detector 31 when the saw blade 23 contacts the workpiece, and an angle section presence signal C from the vertical surface detector 35 (where C=1 for square and rectangular materials for instance, and C=0 for all other materials which have no angle section) are introduced to the calculation device 39. Next, in Step $S_2$ the contact angles $\theta n$ (n=1, ..., 4) for workpieces of various shapes are calculated, based on the workpiece width D.

In Step S3 the judgment is made as to whether the angle section signal C is 1 or 0. When the cross section of the workpiece has no vertical angle section, i.e. C=0, in Step $S_4$, a comparison is made of the input value $\theta$ of the contact angle and the contact angles $\theta_1$, $\theta_2$, $\theta_4$, calculated in Step $S_2$. When the input value $\theta$ and the calculated value $\theta_1$ are equal, in Step $S_5$ the workpiece is judged to be round, and the diameter of the workpiece is indicated as D. When the input value $\theta$ and the calculated value $\theta_2$ are equal, in Step $S_6$ the workpiece is judged to be triangular, and one side of the workpiece is indicated as D. When the input value $\theta$ and the calculated value $\theta_4$ are equal, in Step $S_7$ the workpiece is judged to be hexagonal and the distance between opposite sides of the workpiece or the height is indicated as $\sqrt{3}/2D$.

When the input value $\theta$ is not equal to any of the calculated values for $\theta_1$, $\theta_2$, $\theta_4$, in Step $S_8$ the workpiece is judged to be a shape other than round, triangular, hexagonal, or rectangular and an indication is made to that effect.

If in Step $S_3$ the angle section signal C is 1, then the workpiece W is square or rectangular, and in Step $S_9$ the input value of the contact angle $\theta$ is compared with the calculated value $\theta_3$. When the input value $\theta$ and the calculated value $\theta_3$ are equal, in Step $S_{10}$ the workpiece is judged to be square and one side is indicated as D. When the input value $\theta$ and the calculated value $\theta_3$ are not equal, in Step $S_{11}$ the workpiece is judged to be rectangular and the width D and height H are indicated (H is calculated from Equation (6) in FIG. 4).

When the shape and dimensions of the workpiece W are estimated in the above manner, the saw blade guide transfer cylinder 30 is controlled through the hydraulic pressure control device 37 by a control signal from the control section 46, and the guide bracket 29 is positioned to correspond to the abovementioned shape and dimensions.

The shape of the workpiece W measured by the device of the present invention is not limited to the shapes given above as examples. If there is a uniform functional relationship between the width D and the contact angle $\theta$ the shape of the workpiece can be measured by the above method.

In the case where the largest number of workpiecese subjected to the cutting process are round or square only, it is possible to implement a mode in which the saw blade housing is elevated perpendicularly following a guide post. In this case, it can easily be determined whether the workpiece is round or square, by the detection of the width D of the workpiece and the detection of the angle section (detection of the presence or absence of a vertical surface) using the vertical surface detector 35, and the detection of the height of the position at which the saw blade contacted the workpiece; also the dimensions of the workpiece are obtained from such detections.

Figure 6:
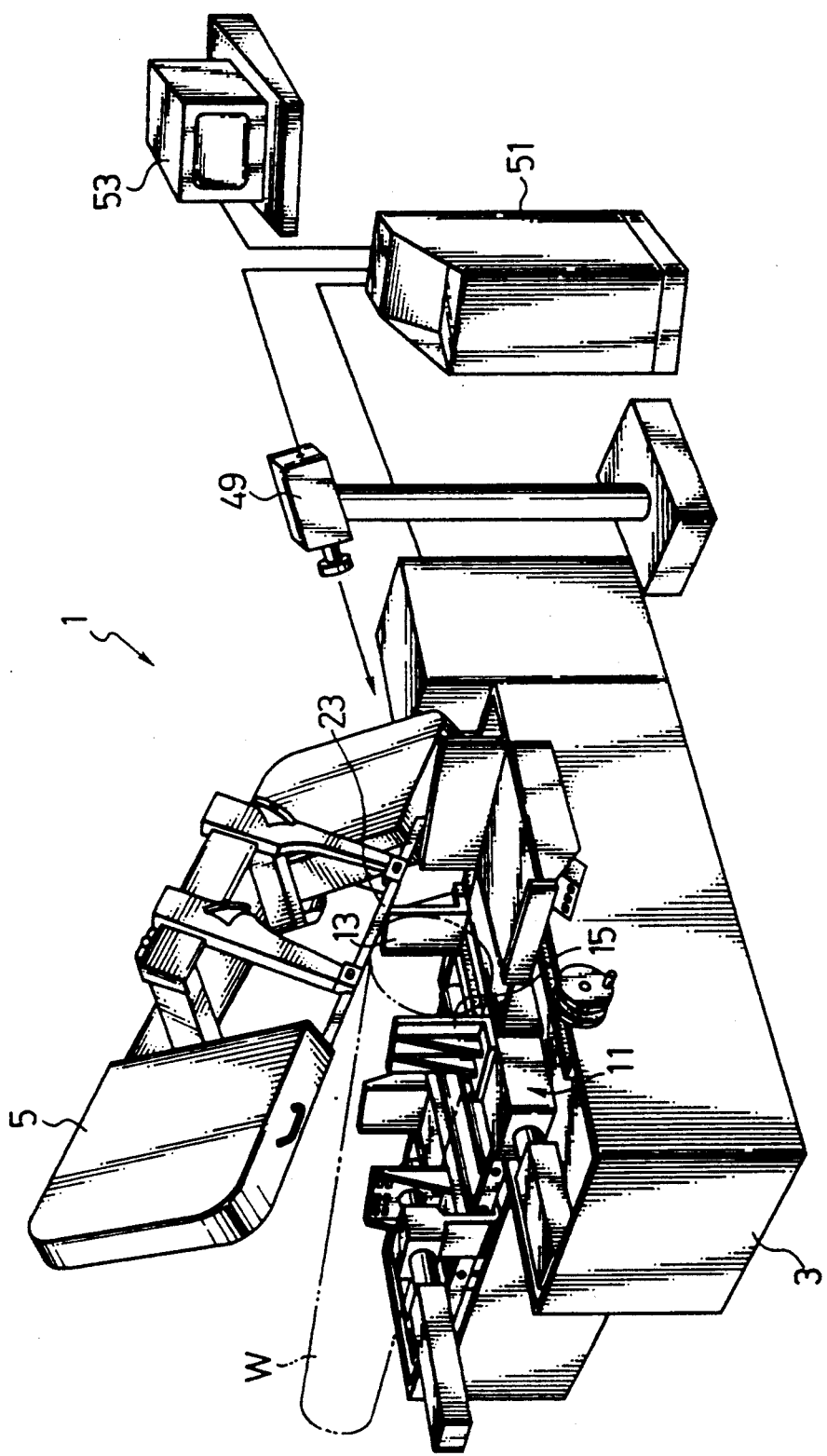
FIG. 6 is a perspective drawing exemplifying the case where a CCD camera is used to measure the shape and dimensions of the workpiece.

Furthermore, it is possible to have a configuration by which the cross sectional shape and the dimensions of the workpiece are measured, for example, as shown in FIG. 6, by a solid state photographic device 49 such as a CCD camera positioned at the front of the band saw machine 1 where it does not interfere with the operation.

In such a configuration, it is possible to determine the shape and dimensions of the workpiece W by processing the image data for the workpiece W which is photographed by the solid state photographic device 49, using an image processing device 51. The operator can confirm the shape and dimensions of the workpiece W by displaying the results of the image processing on a display device 53.

When measuring the shape and dimensions of the workpiece W using the solid state photographic device 49, the photography can be carried out during the cutting of the workpiece W. It is also possible to detect the position at which the saw blade 23 cuts into the workpiece.

As can be understood from the above explanation, the shapes of a wide variety of workpieces fed to the sawing machine can be determined by means of the abovementioned embodiment and the dimensions can be measured and displayed. Accordingly, it is possible to automate the operation of the sawing machine very easily, and an erroneous sawing operation can be prevented by a warning or the like when a workpiece which does not conform to the specifications is fed to the process.

In addition, the saw blade guide can be positioned automatically to conform to the shape and dimeensions of the workpiece. This results in the most suitable positioning.

In the previously outlined embodiment, only the saw blade guide 29 of the saw blade guides 27, 29 is moved by the cylinder 30. However, it is possible to have a configuration by which it is possible to move the sawblade guides 27, 29 together or individually, and to control the position of each. With such a configuration it is possible to automatically adjust the spacing between the saw blade guides 27, 29 to the most suitable spacing to conform to the shape and legnth of cut in the workpiece so that bending and vibration can be suppressed both at the beginning of and during the cutting of the workpiece by the band saw blade 23.

Figure 7:
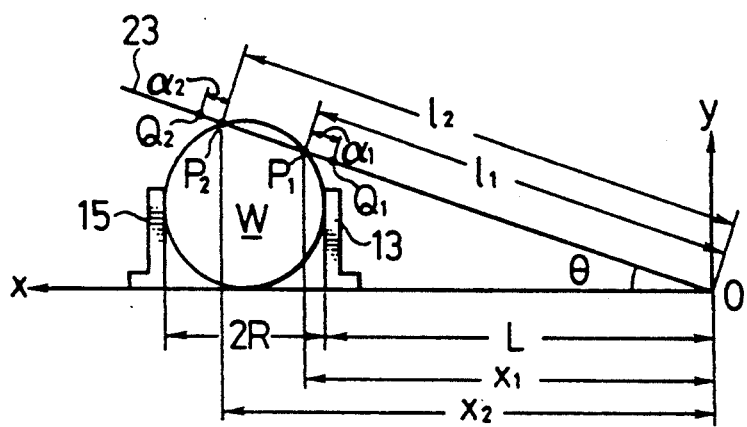
FIG. 7 is an explanatory drawing showing the change in the length of cut from the change in positional relationship between the workpiece and the saw blade.

Now, in adjusting the spacing of the saw blade guides 27, 29 to conform to the shape and length of cut in the workpiece, it is preferable to detect and calculate any changes in the positional relationship between the workpiece W and the band saw blade 23. That is to say, by using these data, the spacing of the saw blade guides 27, can be optimally adjusted in accordance with the change of the length of cut of the workpiece, which changes with the feeding of the housings. When the workpiece W is, for example, a round material as shown in FIG. 7 it is possible to calculate what the next length of cut will be. Specifically, if the diameter of the workpiece is 2R, the distance between the origin O and the clamping surface of the fixed vise jaw 13, L, and the angle of inclination of the saw blade $\theta$, then the positions $P_1$, $P_2$ at which both ends of the length of cut are located are obtained as the point of intersection of the circle represented by an equation, $$(x-R-L)^2+(y-R)^2=R^2,$$

and the straight line of the inclined angle $\theta$, $y = x \tan \theta$.

If the distances from the origin O to the points $P_1$ and $P_2$ are written as $l_1$, $l_2$, then:

$$l_1 = (R + L + R \tan \theta - $$
$$\sqrt{(R + LR \tan \theta)^2 - \sec^2 \theta (R + L)^2 \cos\theta}$$
$$l_2 = (R + L + R \tan \theta + $$
$$\sqrt{(R + LR \tan \theta)^2 - \sec^2 \theta (R + L)^2 \cos\theta}$$

which are functions of $\theta$. The positions $Q_1$, $Q_2$, of the saw blade guides 27, 29 are suitably set to avoid interference with the workpiece W at distances of values $a_1$, $a_2$ respectively from the positions $P_1$, $P_2$. Specifically, the position $Q_1$ is $(l_1 - a_1)$, and position $Q_2$ is $(l_2 + a_2)$. Then, for the greatest length of cut, the saw blade guides 27, 29 are located at positions $\theta_r$ (r=1, 2) where $\theta r = \tan^{-1}(R/R + L)$; the saw blade guides 27, 29 are maximally moved to this position. The points P1 and P2 for non-circular workpieces can be determined by one skilled in the art using the relationships of FIG. 4, as described previously, and applying known trigonometric relationships.

Figure 8:
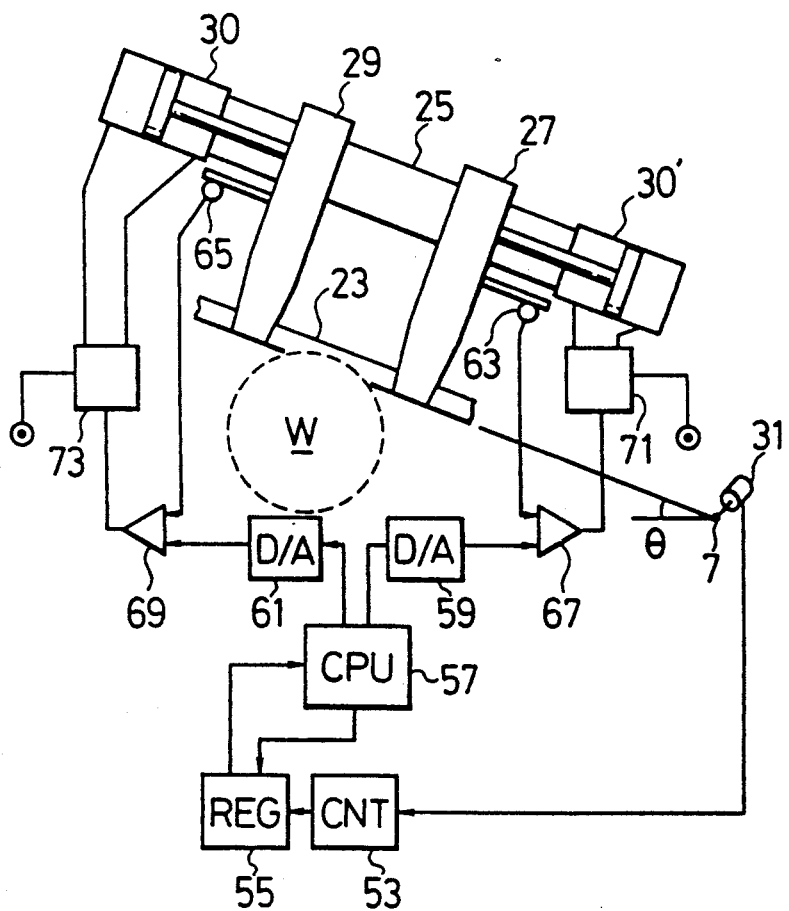
FIG. 8 is a block diagram showing the configuration of a device for adjusting the movement of the saw blade guides.

Next, an adjustment device which moves and adjusts the saw blade guides 27, 29 corresponding to the length of cut will be explained with reference to FIG. 8. This device comprises a rotary encoder 31 which detects the saw blade position and is mounted on the hinge pin 7; a counter 53 which counts the pulses output from the rotary encoder 31; a register 55 in which the value of the count in the counter 53 is temporarily stored in accordance with instruction pulses output at fixed intervals from a later-described calculation device; a calculation device 57 (hereinafter referred to as the CPU 57) which calculates and sets the respective saw blade positions from the values input to the register 55, using a predetermined equation; a pair of D/A conversion devices 59, 61 which convert the digital values output from the CPU 57 to analog values; a pair of potentiometers 63, 65 as detection devices which detect the current positions of the saw blade guides 27, 29; a pair of differential amplifiers 67, 69 which amplify the difference between the current values of the potentiometers 63, 65 and the set values converted to analog in the D/A conversion devices 59, 61; a pair of hydraulic servo valves 71, 73 which are activated by the output from the differential amplifiers 67, 69; and a pair of hydraulic cylinders 30, 30' which move the saw blade guides 27, 29 along the guide member 25, controlled by the hydraulic servo valves 71, 73.

As a result of this configuration, the saw blade position $\theta$ is detected as a number of pulses from the rotary encoder 31 which are counted by the counter 53. The value of the count is transferred to the register 55 in accordance with an instruction pulse signal output from the CPU 57 at fixed intervals. The CPU 57 takes in the count and calculates the desired positions of the saw blade guides 27, 29 from the previously mentioned equation. The output is converted from digital to analog and is fed to the differential amplifiers 67, 69 along with the signals from the potentiometers 63, 65 showing the current position of the saw blade guides 27, 29. The differential amplifiers 67, 69 amplify the voltage differences and feed control signals to the hydraulic servo valves 71, 73. The hydraulic servo valves 71, 73 control the hydraulic cylinders 30, 30' which transfer the saw blade guides 27, 29 and position them at a set position.

Figure 9:
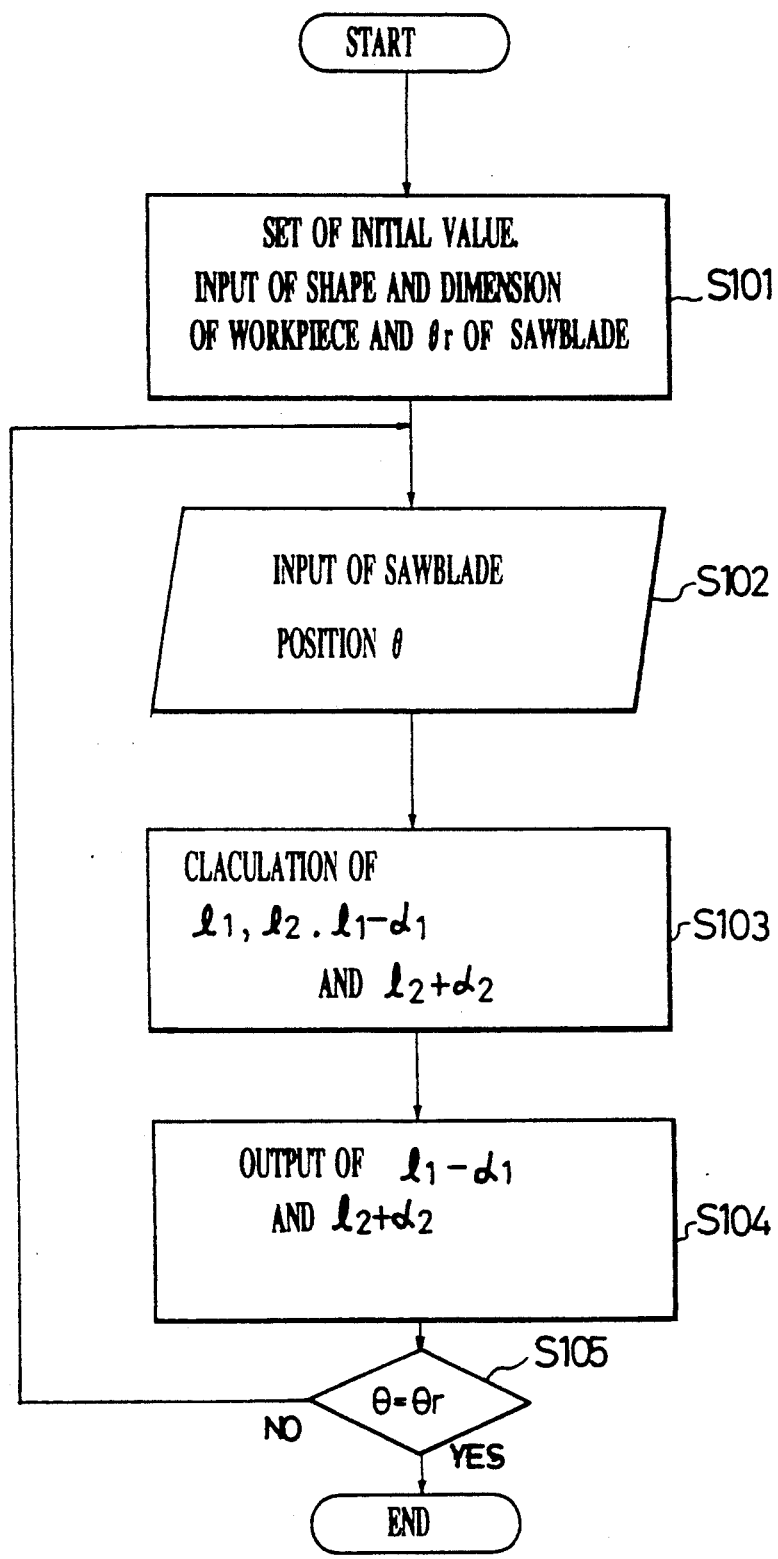
FIG. 9 is a flowchart.

Next, the action of the CPU 57 will be explained in more detail with reference to the flowchart shown in FIG. 9.

In Step $S_{101}$, the initial value is set, and the shape and dimensions of the workpiece W, and the saw blade position $\theta_r$, when the maximum length of cut occurs, are input.

In Step $S_{102}$, the position $\theta$ of the saw blade is detected and input at fixed intervals.

In Step $S_{103}$, the positions $1_1$, $1_2$ at each end of the length of the cut are calculated based on the equation stored in the memory, and the positions $(l_1 - a_1)$ and $(l_2 + a_2)$ of the saw blade guides 27, 29 are calculated.

In Step $S_{104}$, the positions $(l_1 - a_1)$ and $(l_2 + a_2)$ of the saw blade guides 27, 29 are output. The above actions are continued to the position $\theta_r$ which is the position of the saw blade at the maximum length of cut, then, in Step $S_{105}$, the action of the CPU 57 is halted when $\theta = \theta_r$.

Figure 10:
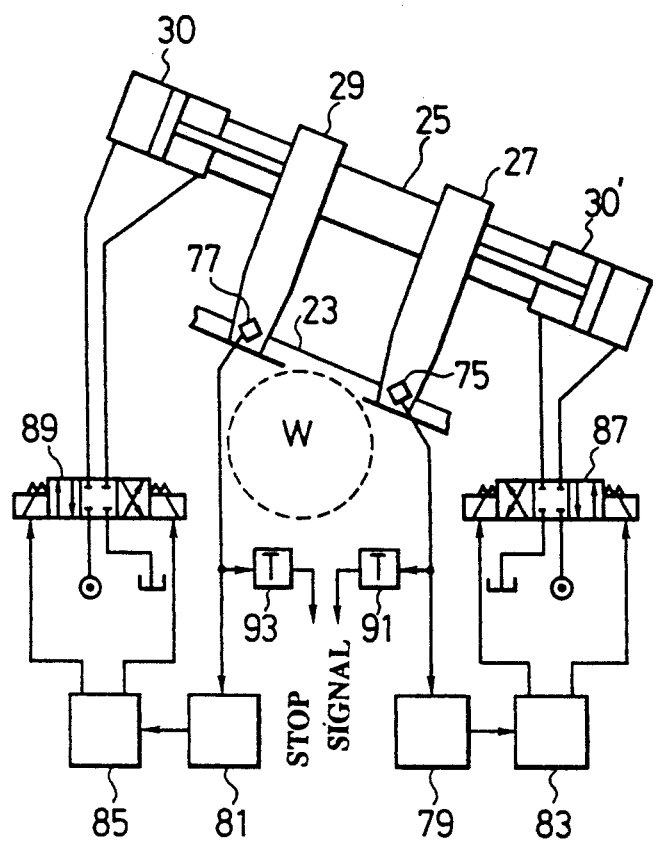
FIG. 10 is a block diagram showing the configuration of a device for adjusting the movement of the saw blade guides.

FIG. 10 shows another embodiment of the device of the present invention. The device of this embodiment comprises a pair of touch sensors 75, 77 as proximity detectors for detecting when the saw blade guides 27, 29 approach the workpiece W; a pair of fixed time operating circuits 79 which operates only for a fixed time period after receiving a signal 81; a pair of solenoid valve controllers 83, 85; a pair of solenoid directional switching valves 87, 89; and a pair of hydraulic cylinders 30, 30'. A pair of protection timers 91, 93 are connected to cut off the power source in case the operation of the touch sensors 75, 77 exceeds a fixed time.

As a result of this configuration, when the touch sensors 75, 79 detect the workpiece W a signal is input to the fixed time operating circuits 79, 81. The fixed time operating circuits 79, 81 energize a pair of solenoids 87a, 89a of the solenoid directional switching valves 87, 89 through the solenoid valve controllers 83, 85 for an optionally set time period only. When the solenoids 87a, 89a are energized, pressurized fluid is fed to the rod side of the hydraulic cylinders 30, 30' and the saw blade guides 27, 29 move away from the workpiece W for the fixed period of time. The touch sensors 75, 77 also move away from the workpiece W and the contact is cut. This action causes a cessation of operation when a cut is being made in the top half of the workpiece W.

Figure 11:
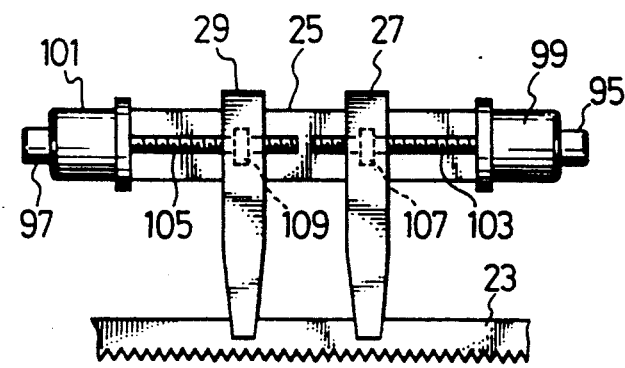
FIG. 11 is a drawing showing the embodiment of a transfer device.

FIG. 11 shows another embodiment of a device which transfers and positions the saw blade guides 27, 29. In this embodiment a pair of screw members 103, 105 are rotated by a pair of servo motors 99, 101 provided with a pair of rotation detectors 95, 97, which can be rotary encoders. A pair of nut members 107, 109 which are engaged by the screw members 103, 105 act to move the saw blade guides 27, 29.

Figure 12:
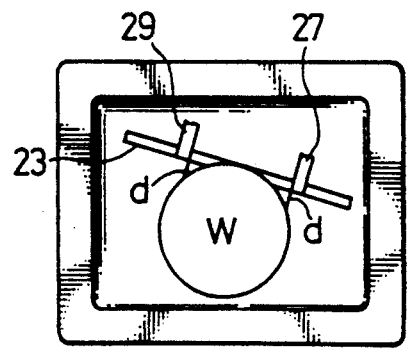
FIG. 12 is an explanatory drawing for the case where a CCD camera is used.

FIG. 12 shows still another embodiment of the present invention. In this embodiment, the workpiece W and the saw blade guidees 27, 29 are photographed by a CCD camera, the image is processed by an image processing device and displayed on a display device. The distance d between the workpiece W and the saw blade guides 27, 29 is calculated. When this distance d is below a set value, the saw blade guides 27, 29 are moved away from the workpiece W. A device comprising the previously mentioned hydraulic cylinders and a screw mechanism rotated by a servo motor can be adopted as the device for moving the saw blade guides 27, 29.

The sawing machine utilizing the device of the present invention is not limited to the horizontal band saw machine given here as an example. A vertical band saw machine provided with a driving wheel and a follower wheel separated vertically can also be used. When a vertical band saw machine is used it is only necessary for the top saw blade guide to be adjusted and positioned vertically.

As can be understood from the explanation of the abovementioned embodiments, because the position of the saw blade guides can be calculated and set, based on the position of the saw blade and the shape of the workpiece, the position of the saw blade guides can be adjusted automatically to correspond to changes in the length of cut in the workpiece, regardless of the shape of the workpiece. Reducing of bending and vibration is therefore possible. In addition, the shape of the cross section of the workpiece can also be determined automatically.

What is claimed is:

1. A method for recognizing the shape and dimensions of a workpiece which is to be cut by a band sawing machine having a saw blade and a movable vise for clamping the workpiece, and for preventing a misplaced workpiece from being cut, comprising the steps of:

(a) detecting the width D of the workpiece by measuring moved distance of the movable vise;
    (b) measuring a parameter selected from the group consisting of a contact angle $\theta$ and a height H of the saw blade when the saw blade contacts the workpiece prior to starting cutting, by using a detector selected form the group consisting of an angle detector and a height detector;
    (c) detecting whether a vertical side surface of the workpiece is present, by a contact sensor provided at a position selected from the group of positions consisting of positions of and along the vise;
    (d) presuming the external form and dimensions of the workpiece from data including the width D, one of the contact angle $\theta$ and the height H, and whether a vertical side surface is present; and
    (e) comparing the external form and dimensions of the workpiece with previously obtained values with respect to the workpiece to be cut;
    (f) determining that the workpiece is misplaced if the external form and dimensions differ from the obtained values; and
    (g) stopping machining of the missplaced workpiece, thereby preventing it from being cut.

2. The method of claim 1, wherein measuring the parameter selected from the group consisting of contact angle $\theta$ and a height H of the saw blade is performed when an electric current is generated in the saw blade provided with a circuit.

3. The method of claim 1 or 2, wherein the method further comprises a step of displaying the dimensions of the workpiece after the step (d).

4. A method for recognizing the shape and dimensions of a workpiece which is to be cut by a band sawing machine having a saw blade and a movable vise for clamping the workpiece, and for positioning a saw blade guide of the machine, comprising the steps of:

(a) detecting a width D of the workpiece by means of a width detector;
    (b) measuring a parameter selected from the group consisting of a contact angle $\theta$ and a height H of the saw blade when the saw blade contacts the workpiece prior to starting cutting, by using a detector selected form the group consisting of an angle detector and a height detector;
    (c) detecting whether a vertical side surface of the workpiece is present, by a contact sensor provided at a position selected from the group of positions consisting of positions of and along the vise;
    (d) presuming the external form and dimensions of the workpiece from data including the width D, one of the contact angle $\theta$ and the height H, and whether a vertical side surface is present;
    (e) detecting a parameter selected from the group consisting of a contact angle and a height of the saw blade during cutting by means of a detector selected from the group consisting of an angle detector and a height detector;
    (f) detecting positions of points defined by intersections of the saw blade and the outline of the workpiece; and
    (g) positioning the saw blade guide in a place which is a distance apart from the points.

5. An apparatus for recognizing the shape and the dimensions of a workpiece clamped by a movable vice of a band sawing machine having a saw blade so as to position a saw blade guide of the machine, comprising:

a device for measuring a width D of the workpiece based on the movement of the vise;
    a device for measuring a parameter selected from the group consisting of a contact angle $\theta$ and a height H of the saw blade when the saw blade contacts the workpiece prior to starting cutting;
    a contact sensing device for detecting whether a vertical side surface of the workpiece is present, the contact sensing device being provided at a position selected from the group of positions consisting of positions on and along the vise;
    means for presuming the external form and dimensions of the workpiece from data including the width D, one of the contact angle $\theta$ and the height H of the saw blade and whether a vertical side surface of the workpiece is present;
    means for comparing the presumed external form and dimensions of the workpiece with data which has been previously obtained with respect to the workpiece to be cut, thereby performing a comparison; and
    means for positioning a saw blade guide in response to the comparison.

6. An automatic position adjusting device for adjusting the position of at least one saw blade guide of a band sawing machine having at least two saw blade guides and having a movable vice for clamping a workpiece to be cut by the machine, comprising:

a device for measuring a width of the workpiece from the movement of the movable vise;
    a device for measuring a parameter selected from the group consisting of a contact angle and a height of the saw blade at a time when the saw blade contacts the workpiece and at intervals during the cutting process;
    a contact sensing device for detecting whether a vertical side surface of the workpiece is present;
    means for presuming the external form and dimensions of the workpiece, the position of the saw blade relative to the workpiece in the cutting process based on data including the width of the workpiece, each contact angle or height of the saw blade at the time when the saw blade contacts the workpiece and at intervals during the cutting, and whether a vertical side surface of the workpiece is present; and
    a transfer device for positioning the saw blade guide in a place determined based on the presumed data.

* * * * *

UNITED STATES PATENT AND TRADEMARK OFFICE
CERTIFICATE OF CORRECTION

Page 1 of 2

PATENT NO. : 5,208,760
DATED : May 4, 1993
INVENTOR(S) : Kikuo MORIYA

It is certified that error appears in the above-identified patent and that said Letters Patent is hereby corrected as shown below:

Column 3, line 62, "blade we" should be --blade 23--.

Column 5, line 23, "$\vee 3/2D$" should be --$\sqrt{3}/2D$--;
        line 52, "workpiecese" should be --workpieces--.

Column 6, line 29, "dimeensions" should be --dimensions--.

Column 8, line 56, "guidees" should be --guides--.

IN THE CLAIMS:

Column 9, claim 1, line 31, "form" should be --from--;
                  line 46, "missplaced" should be --misplaced--.

UNITED STATES PATENT AND TRADEMARK OFFICE
CERTIFICATE OF CORRECTION

PATENT NO. : 5,208,760
DATED : May 8, 1993
INVENTOR(S) : Kikuo MORIYA

It is certified that error appears in the above-identified patent and that said Letters Patent is hereby corrected as shown below:

Column 9, claim 4, line 67, "form" should be --from--.

Column 10, claim 5, line 19, "vice" should be --vise--.

claim 6, line 47, "vice" should be --vise--.

Signed and Sealed this

Fifteenth Day of March, 1994

Attest:

BRUCE LEHMAN

*Attesting Officer*     *Commissioner of Patents and Trademarks*